Patented Mar. 5, 1935

1,993,280

UNITED STATES PATENT OFFICE 1,993,280

MANUFACTURE OF COMPOSITIONS CONTAINING RUBBER OR SIMILAR MATERIALS

Edward Arthur Murphy, Wylde Green, Birmingham, and Alfred Niven, Erdington, Birmingham, England, assignors to Dunlop Rubber Company Limited, Birmingham, England, a British corporation No Drawing. Application March 16, 1933, Serial No. 661,192. In Great Britain March 24, 1932

15 Claims. (Cl. 106—23)

This invention comprises improvements in or relating to the manufacture of compositions containing rubber or similar materials from aqueous dispersions or emulsions of the kinds hereinafter specified.

Another object of the invention is to produce dough-like or paste-like aqueous compositions containing rubber and asbestos from aqueous emulsions.

To obtain satisfactory distribution of rubber latex in asbestos fibre mixtures, it has heretofore been necessary either to stabilize the latex with relatively large amounts of protective colloids and also to subject it to considerable dilution before admixing with asbestos pulp, or to subject the asbestos to a pre-treatment such as extraction with hydrochloric acid.

To obtain a homogeneous mixture of the rubber latex and asbestos pulp it was also necessary that the concentration of the asbestos pulp should also be small, making in this way the final concentration of the mixture very low.

Although this dilution was not in all cases detrimental to the production of thin sheets, it presented greater difficulty in the production of thicker sheets as these thick sheets must be built up in layers.

The use of dilute mixings also necessitated the taking of precautions to obviate any considerable shrinkage during the final drying.

According to the present invention, the method for the production of compositions containing rubber and asbestos comprises admixing asbestos fibre with flocculent or granular precipitates produced from aqueous emulsions or dispersions of the kinds hereinafter specified.

It has been found that working according to the present invention rubber precipitates can be prepared from rubber latex which are capable of being mixed uniformly with dry asbestos fibre to give dough compounds containing a relatively small proportion of water. In such condition the mixture of rubber and asbestos fibre may be pressed directly into sheets, dried rapidly and subsequently vulcanized.

If desired, the aforesaid admixture of the flocculent or granular precipitates of rubber and asbestos fibre can be compacted by a filtering operation.

If desired, the asbestos fibre can be used, in admixture with other mineral matter.

It has been known for some time that instead of the usual adherent coagulum it is possible to obtain rubber as a flocculent precipitate from latex by the use of certain coagulants and by adjustment of the concentration of the latex, as described for instance in "Estate Rubber" O. de Vries, page 143, 1920.

The aforesaid flocculent or granular precipitates can be prepared from rubber latex in controllable manner by the use of varied coagulating agents and methods of coagulation provided that the coagulation is effected in the presence of a relatively large quantity of water and with or without the presence of certain amounts of alkaline or colloidal substances found to have a restraining effect upon the coagulation.

The filtering means employed may be for example of ceramic material, cotton fabric, or fine mesh wire gauze. If desired, suction may be employed to aid filtration and/or pressure may be applied to the filter cake.

Examples of suitable coagulants are acetic acid, formic acid, hydrochloric acid, sulphuric acid, sodium silicofluoride, aluminum chloride, alum, barium chloride, calcium nitrate, zinc sulphate, magnesium acetate, magnesium sulphate, ferrous sulphate and ferric sulphate.

Examples of substances having a restraining effect on the coagulation are caustic potash, casein, sodium aluminate, glue and gum acacia. The amount of such substances used also influences the degree of subdivision of the granular dispersion.

The degree of concentration has also an influence on the fineness of the precipitate. In general the lower the concentration the finer the initial precipitate.

The aqueous dispersions aforesaid are preferably employed at such dilutions that 100 ccs. thereof contain not more than 10% of total solids.

By the suitable choice of reagents and conditions of working granular dispersions of varying consistency can be formed.

If desired, the granular precipitates can be washed free from soluble reaction products such as soluble sulphates or chlorides by known means as for instance by decantation or filtration and washing prior to their compacting.

The emulsions or dispersions of rubber or the like comprise those consisting of rubber, guttapercha, balata, or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in the first instance in concentrated form.

It is desirable that the proportion of vulcanizing ingredient should be high.

Concentrates such as are obtained in Patent 1,846,164 and in British Patent 219,635, to which may be added any one or more of the usual known compounding ingredients may also be employed subsequent to dilution.

The aforesaid vulcanization and/or compounding ingredients which are added in the form of their dispersions may be added to the aforesaid aqueous emulsions or dispersions of rubber or the like prior or subsequent to the precipitation of the granular or flocculent coagula.

It is preferable to add the aforesaid dispersions of the vulcanizing and other compounding ingredients before the precipitation of the granular precipitates.

It has been found that the compositions obtained according to this invention are suitable for the production of a large variety of articles, such as brake lining, rubber asbestos tiling, flooring and substitutes for leather.

The following example illustrates how the process can be effected for the production of brake lining:—

A latex mixing having the following composition:—

|  | Parts by weight |
|---|---|
| Rubber | 100 |
| Sulphur | 40 |
| Zinc oleate | 3 |
| Mercaptobenzthiasole | 0.5 |
| Mineral oil | 10 |
| China clay | 10 |
| Zinc oxide | 2 | is prepared from a 60% rubber latex obtained by centrifugal action.

The mixing is compounded and concentrated according to the processes described and claimed in Patents 1,846,164 and 1,898,604.

The final solid content of the mixing is 53%.

This mixing is converted into granular precipitate in the following manner:—

To 132 parts by weight of the mixing 0.8 part by weight of a 25% solution of caustic potash, 4 parts by weight of a 10% solution of casein, and 80 parts by weight of a lamp black dispersion (containing 25% lamp black) are added. To this admixture 600 parts by weight of water, 18 parts by weight of sodium silicate (50% concentration) in the form of a 10% solution, and 16.5 parts by weight of aluminium sulphate in the form of a 10% solution are added, after each addition the admixture is well stirred.

The resulting rubber precipitate is allowed to drain on a filter, and a paste-like mass is obtained containing approximately 20% of total solids. This paste-like mass is then placed in an internal mixing machine and mixed with 110 parts of dry asbestos fibre until a uniform dough is obtained.

The dough is then placed in moulds, pressed in the moulds, allowed to dry, and then vulcanized under pressure for ¾ hour at 60 lbs. steam pressure.

The products produced in this manner contain asbestos 55 parts, compounded rubber precipitate 38.5 parts, and lamp black 10 parts.

What we claim is:—

1. A method for the production of compositions containing rubber and asbestos which comprises admixing asbestos fibre with an aqueous paste of suspended flocculent or granular precipitates produced from aqueous emulsions or dispersions of rubber material to form a mixed suspension of rubber and fibre.

2. A method as claimed in claim 1, wherein the aforesaid flocculent or granular precipitates are admixed at a concentration of about 20% uniformly with dry asbestos fibre to give dough compounds containing a relatively small proportion of water.

3. A method for the production of sheets of rubber and asbestos, which comprises mixing asbestos fibre with an aqueous paste of flocculent or granular precipitates produced from aqueous emulsions of rubber material and pressing the resulting mixture into sheets.

4. A method for the production of compositions containing rubber and asbestos, which comprises admixing asbestos fibre with an aqueous suspension of flocculent or granular precipitates from an aqueous emulsion of rubber material and filtering the water from said mixture to leave a compact mass.

5. A method of producing rubber articles, which comprises admixing an asbestos fibre with flocculent or granular precipitates of rubber material suspended in an aqueous medium and separating the resulting mixture from the aqueous medium.

6. A method of forming rubber and asbestos compositions which comprises forming a flocculent or granular precipitate of rubber material from an aqueous dispersion thereof, removing sufficient water from said dispersion to leave a paste-like mass and mixing asbestos fibres into said mass.

7. A method of forming rubber and asbestos compositions which comprises forming a flocculent or granular precipitate of rubber material from an aqueous dispersion thereof, removing sufficient water from said dispersion to leave a paste-like mass, mixing asbestos fibres into said mass and vulcanizing the resulting mixture to a hard rubber.

8. A method of forming rubber and fibrous material which comprises forming a flocculent or granular precipitate of rubber material from an aqueous dispersion thereof, removing sufficient water from said dispersion to leave a paste-like mass and mixing fibrous material into said mass.

9. A process of bonding granular fibrous or other divided materials which comprises forming a granular precipitate of rubber by adding to an aqueous dispersion of rubber a water soluble reagent having no coagulating or precipitating effect on the rubber and a second water soluble reagent to react with said first reagent to form an insoluble precipitate and to precipitate the rubber therewith from said dispersion, and suspending said precipitate with the fibrous material to be bonded in an aqueous medium.

10. A process of bonding granular fibrous or other divided materials which comprises forming a granular precipitate of rubber by adding to an aqueous dispersion of rubber a water soluble reagent having no coagulating or precipitating effect on the rubber and a second water soluble reagent to react with said first reagent to form an insoluble precipitate and to precipitate the rubber therewith from said dispersion, and suspending said precipitate with the fibrous material to be bonded in an aqueous medium, and filtering said mixed suspension of rubber and material to be bonded.

11. A process of bonding granular fibrous or other divided material which comprises forming a washable granular precipitate of rubber by adding to an aqueous dispersion of rubber first a water soluble reagent having normally no coagulative effect on said dispersion and then adding a second reagent reacting with said first reagent to form an insoluble inorganic compounding ingredient and having ions to precipitate the rubber of said dispersion therewith to a washable crumb-like form, mixing the resulting precipitate with finely divided materials in suspension in an aqueous medium, and separating said precipitate of rubber composition in admixture with said finely divided material from said mixed suspension of said rubber and divided materials.

12. A process of bonding fibrous, granular or other divided materials which comprises adding to a concentrated latex a small quantity of casein in ammoniacal solution, adding a small quantity of sodium silicate solution and then an equivalent quantity of magnesium sulphate solution, mixing the resulting precipitate with a relatively large quantity of material to be bonded in suspension in a large quantity of water, and separating the suspension from the aqueous medium in a compact mass.

13. A process of bonding fibrous, granular or other divided materials which comprises adding to a concentrated latex a small quantity of casein in ammoniacal solution, adding a small quantity of sodium silicate solution and then an equivalent quantity of magnesium sulphate solution, mixing the resulting precipitate with a relatively large quantity of material to be bonded in suspension in a large quantity of water, and separating the suspension from the aqueous medium in a compact mass by filtration.

14. The method of forming a rubber composition containing fibrous material which comprises coagulating a dispersion of rubber material to form a granular or finely divided precipitate in an aqueous suspension, thereafter mixing said suspension with fibrous material, and separating the mixture of precipitate and fibrous material to a compact mass.

15. The method of bonding fibrous materials which comprises coagulating a rubber dispersion to form a suspension of finely divided precipitate of dispersed material, mixing a fibrous material in said suspension, and separating said precipitate and the fibrous material admixed therewith from the suspending medium.

EDWARD ARTHUR MURPHY.
ALFRED NIVEN.